(12) United States Patent
Baumann

(10) Patent No.: US 10,072,378 B2
(45) Date of Patent: Sep. 11, 2018

(54) WATER REPELLENT, SOIL RESISTANT, FLUORINE-FREE COMPOSITIONS

(71) Applicant: INVISTA TECHNOLOGIES S.À.R.L., St. Gallen (CH)

(72) Inventor: Markus Baumann, Wiesloch (DE)

(73) Assignee: INVISTA NORTH AMERICA S.Ä.R.L., Wilmington, DE (US)

( * ) Notice: Subject to any disclaimer, the term of this patent is extended or adjusted under 35 U.S.C. 154(b) by 97 days.

(21) Appl. No.: 15/036,154

(22) PCT Filed: Nov. 12, 2014

(86) PCT No.: PCT/US2014/065211
§ 371 (c)(1),
(2) Date: May 12, 2016

(87) PCT Pub. No.: WO2015/073532
PCT Pub. Date: May 21, 2015

(65) Prior Publication Data
US 2016/0298290 A1 Oct. 13, 2016

(30) Foreign Application Priority Data
Nov. 12, 2013 (EP) ..................................... 13192548

(51) Int. Cl.
| D06M 15/643 | (2006.01) |
|---|---|
| C08L 83/04 | (2006.01) |
| B05D 1/02 | (2006.01) |
| C09D 183/08 | (2006.01) |
| D06M 23/04 | (2006.01) |
| D06M 23/06 | (2006.01) |
| C08G 77/26 | (2006.01) |

(52) U.S. Cl.
CPC ............ *D06M 15/643* (2013.01); *B05D 1/02* (2013.01); *C08L 83/04* (2013.01); *C09D 183/08* (2013.01); *D06M 15/6436* (2013.01); *C08G 77/26* (2013.01); *C08L 2201/22* (2013.01); *C08L 2205/025* (2013.01); *D06M 23/04* (2013.01); *D06M 23/06* (2013.01); *D06M 2200/01* (2013.01); *D06M 2200/12* (2013.01)

(58) Field of Classification Search
CPC ................ D06M 15/643; D06M 15/6436
USPC ............................ 252/8.61, 8.62, 8.81, 8.84
See application file for complete search history.

(56) References Cited

U.S. PATENT DOCUMENTS

| 4,264,484 A | 4/1981 | Patel | |
| 4,421,796 A * | 12/1983 | Burril | D06M 15/647 |
| | | | 252/8.61 |
| 5,258,458 A | 11/1993 | Allewaert et al. | |
| 5,593,483 A * | 1/1997 | Brunken | C09D 183/04 |
| | | | 106/18.12 |
| 6,225,403 B1 * | 5/2001 | Knowlton | C09D 183/04 |
| | | | 524/501 |
| 6,262,171 B1 | 7/2001 | Mayer et al. | |
| 6,736,857 B2 * | 5/2004 | Chang | C11D 3/0031 |
| | | | 427/346 |
| 6,824,854 B2 | 11/2004 | Materniak et al. | |
| 7,981,961 B2 | 7/2011 | Heller et al. | |
| 2003/0060395 A1 * | 3/2003 | Chang | C11D 3/0031 |
| | | | 510/460 |
| 2005/0229327 A1 * | 10/2005 | Casella | C11D 3/0015 |
| | | | 8/115.51 |
| 2006/0160715 A1 * | 7/2006 | Barraza | C11D 3/162 |
| | | | 510/276 |
| 2010/0068960 A1 | 3/2010 | Soane et al. | |
| 2010/0115706 A1 | 5/2010 | Bender | |
| 2010/0215894 A1 | 8/2010 | Iverson et al. | |
| 2011/0009553 A1 | 1/2011 | Heller et al. | |

FOREIGN PATENT DOCUMENTS

| DE | 19517346 A1 | 11/1996 |
| DE | 10-2006058790 A1 | 6/2008 |
| EP | 0552874 A2 | 7/1993 |
| EP | 1368525 A2 | 12/2003 |
| EP | 2205688 A1 | 7/2010 |
| EP | 2222734 A1 | 9/2010 |
| EP | 2253650 A1 | 11/2010 |
| EP | 2391579 A2 | 12/2011 |
| JP | 10-158515 A | 6/1998 |
| WO | 2002/068752 A2 | 9/2002 |
| WO | 2009/055561 A1 | 4/2009 |
| WO | 2009/058795 A1 | 5/2009 |
| WO | 2010/088643 A2 | 8/2010 |
| WO | 2012/130332 A1 | 10/2012 |
| WO | 2015/073532 A1 | 5/2015 |

OTHER PUBLICATIONS

International Search Report and Written Opinion Received for PCT Application No. PCT/US20141065211, dated Mar. 4, 2015, 12 pages.
International Preliminary Report on Patentability Report Received for PCT Patent Application No. PCT/US2014/065211, dated May 26, 2016, 9 pages.

* cited by examiner

*Primary Examiner* — Marc S Zimmer
(74) *Attorney, Agent, or Firm* — Robert B. Furr, Jr.

(57) ABSTRACT

The present invention pertains to a fluorine-free composition for treating textile articles being water repellant, sol resistant and stain resistant, especially carpets comprising a first composition comprising an aqueous silicone emulsion, an aqueous dispersion of a silane quaternary ammonium salt and water and a second composition comprising a soil repellency component that is an aqueous dispersion of colloidal organosiloxane copolymers.

12 Claims, No Drawings

WATER REPELLENT, SOIL RESISTANT, FLUORINE-FREE COMPOSITIONS

CROSS-REFERENCE TO RELATED APPLICATION

This application claims the benefit of priority from European Patent application number 13192548.9 filed Nov. 12, 2013. This application hereby incorporates by reference this application in its entirety.

The present invention pertains to fluorine-free compositions rendering textile articles, such as carpets and other textile floor coverings made from synthetic fibres or natural fibres water repellent, soil resistant and stain resistant. The invention pertains additionally to a method for treating textile articles and for treated textile articles being water repellent, soil resistant and stain resistant, especially carpets.

Generally, it was known to use fluorine containing chemicals and compositions to impart a variety of valuable properties to textile fibres of synthetic or natural origin, especially to protect carpets and other textile floor coverings from wetting and soiling.

RELATED ART

U.S. Pat. No. 6,824,854 discloses a carpet treated with a soil resistant agent comprising a dispersion of polyfluoro organic compounds having at least one urea, urethane or ester linkage in combination with an anionic surfactant. The ratio of polyfluoro compound to surfactant is thereby from about 0.075:1.0 to about 5:1.

U.S. Pat. No. 4,264,484 relates to a carpet which is soil resistant and stain resistant and which has been treated with a composition comprising a liquid containing a water-insoluble polymer derived from ethylenically unsaturated monomer free of nonvinylic fluorine having one major transition temperature higher than about 25° C. and a water insoluble fluoroaliphatic radical- and aliphatic chlorine-containing ester having a major transition temperature higher than about 25° C.

EP-A 2 205 688 discloses a method of treating substrates with fluorinated water-soluble (meth)acrylate copolymers which do impart water repellancy, soil resistance and stain resistance to the treated substrates thereby EP-A 2 222 734 describes a copolymer and a method for treatment of fibrous substrates with such copolymer to render them soil resistant and to impart minimal water repellency. The copolymer is prepared by polymerization of methacrylic acid with certain fluorinated alkylated benzyl isocyanates having straight chain or branched perfluoroalkyl groups.

It has also been known, to impart fluorine-free water repellency to textiles and fabrics.

EP-A 1 368 525 describes a composition and its use for treating textiles, fibres and fabric substrates, whereby desirable properties like water repellency and durability are enhanced. Said composition is a quite complex mixture of various components such as a compound having an epoxy functionality, a compound having an alkoxy functionality, a crosslinking component selected from specific compounds and a catalyst comprising metal salts of mineral acids, e.g. zinc chloride, magnesium chloride, metal soaps and anhydrides. A condensation product is formed that is suitable to impart the desired properties to textiles when the compounds having the particular functionalities and the crosslinking component is reacted with the catalyst and cured.

However, the related art fails to disclose a carpet or a textile floor covering treated with fluorine-free chemical compositions providing both, soil resistance and water repellency, and a carpet or textile floor covering free of fluorine and having these high quality properties.

Moreover, there is an increasing interest in the carpet and textile floor covering industry to replace the presently used $C_6$-fluorochemicals with fluorine-free soil resistant and water repellent products. Eco labels such as "Blue Angel," which is awarded by RAL gGmbH, St. Augustin, Germany and others are continuously reinforcing this trend.

OBJECT OF THE INVENTION

Thus, it was an object of the present disclosure to provide fluorine-free compositions that reliably impart surface protection to textile flooring substrates against the detrimental influences of water and soil. Such compositions should be easy to manufacture and easy to apply to textiles of synthetic or natural origin, while at the same time imparting a comparable protection as with fluorine containing chemicals as they are currently available on the market. In addition, reliable water repellency should be provided to carpets and textile floor coverings by treatment with such new compositions.

BRIEF DESCRIPTION OF THE INVENTION

The present invention, therefore, pertains to a fluorine-free composition comprising:

W1) An aqueous silicone emulsion having a silicone content of from 10 to 30 wt.-%, preferably from 15 to 25 wt.-%, based on the total weight of said aqueous emulsion, and having a particle size, $d_{50}$, from 25 to 100 nm, preferably from 40 to 80 nm, W2) An aqueous dispersion of a silane quaternary ammonium salt having a solid content of from 1.0 to 7.0 wt.-%, preferably from 2.5 to 5.5. wt.-%, more preferred from 3.0 to 5.0 wt.-%, based on the total weight of said dispersion, and W3) water, whereby the mixing ratio is from 0.5 to 4.0 volume parts for W1, from 0.7 to 1.5 volume parts for W2, and from 1.0 to 4.0 volume parts for W3 yielding in component W.

S) A soil repellency component S that is an aqueous dispersion of colloidal organosiloxane copolymers, and which has an overall cationic or anionic charge, and that are of average particle size between 25 and 400 nm, preferably between 30 and 250 nm, more preferably between 30 and 200 nm, including between 30 and 50 nm.

Another object of the invention is an article of manufacture, especially a carpet or a textile floor covering, which is treated with the composition as defined herein-before by e.g. spray application or foam application, whereby the article is rendered water repellent and soil resistant.

Another object of the invention is a method for the treatment of textiles or fibres of synthetic or natural origin with a composition as defined herein-before in an effective amount to render the textiles or fibres water repellent and soil resistant.

Another object of the invention is a kit providing in separate containers a) a mixture of the components W1, W2, and W3 in a given mixing ratio called Component W and b) Component S (a soil repellency component) that can then be mixed and/or used at a place of carpet manufacture.

DETAILED DESCRIPTION OF THE INVENTION

The water repellency composition, Component W

Water repellency refers to the degree to which a substrate repels water and water/isopropanol mixtures and is determined using a similar method to that for oil repellency.

Unlike currently applied soil resistant or water repellent chemicals, the composition provided by the instant invention is free of fluorine containing ingredients. The composition comprises two components, W and S, and the ratio of W to S applied onto the carpet or textile floor covering may be adjusted to achieve maximum water and soil repellency benefit at economically advantageous use rates.

Typical silicones, or polysiloxanes, useful in the invention as component W1 include those described by von Alberti in WO 2012/130332. WO 2012/130332 is incorporated herein in its entirety. The polysiloxanes described by von Alberti are the general aminopolysiloxanes of Formula I:

$$R^1_a R^2_b (OR^3)_c SiO_{(4-a-b-c)/2} \quad (I)$$

Wherein:

$R^1$ means identical or different monovalent, nitrogen-free, optionally halogen substituted, SiC-bonded $C_1$-$C_6$ alkyl radicals, $R^2$ means identical or different monovalent, optionally halogen-substituted SiC-bonded, basic nitrogen containing $C_1$-$C_6$ alkyl radicals, $R^3$ is H or a $C_1$-$C_8$ alkyl radical, a is 0, 1, 2 or 3, preferably 0, 1 or 2, b is 0, 1, 2 or 3, preferably 0, 1 or 2, or at least an average of 0.05, and c is 0 or 1, with the proviso that the sum of a, b, and c is less than or equal to 3 and that the amine number of the organopolysiloxane is at least 0.01 More preferably, the average value of b is about 1 to about 2. More preferably, the alkoxy group $OR^3$ is selected from a $C_1$-$C_5$ alkoxy group, and represents in particular methoxy, ethoxy and propoxy. More preferably, the alkoxy group $OR^3$ is only the terminal unit of formula (I).

"Halogen" means —Cl, —Br or —I, preferably —Cl or —Br, more preferably —Cl.

A "basic nitrogen" is a primary, secondary or tertiary amine, preferably a primary and/or secondary amine.

Preferred examples of $R^2$ are $H_2N(CH_2)_3$—, $H_2N(CH_2)_2NH(CH_2)_2$—, $H_2N(CH_2)_2NH(CH_2)_3$—, $H_2N(CH_2)_2$—, $H_3CNH(CH_2)_3$—, $C_2H_5NH(CH_2)_3$—, $H_3CNH(CH_2)_2$—, $C_2H_5NH(CH_2)_2$—, $H_2N(CH_2)_4$—, $H_2N(CH_2)_5$—.

More preferred alkylaminoalkyl groups $R^2$ are represented by formula (II):

$$H_2NR^4NHR^5- \quad (II)$$

where $R^4$ and $R^5$ are preferably each independently a $C_1$-$C_3$ alkylene. The above-exemplified groups that fall under formula II are especially preferred.

The concentrates according to the invention typically contain polysiloxane-stabilizing emulsifiers. Preferred concentrates according to the invention contain a non-surfactant emulsifier species. Glycols and glycol ethers are particularly preferred. Examples of particularly preferred non-surfactant emulsifier species are diethylene glycol monobutyl ether (butyl diglycol) and ethylene glycol monohexyl ether (hexyl glycol). The preferred emulsifiers ensure the polysiloxane constituents are kept as a finely divided emulsion in water. Nano-scale emulsions are especially beneficial for application to a carpet surface for water repellency benefit, and mean (=average) droplet sizes of about 10 nm to about 400 nm, especially 30 to 100 nm, for example about 55 nm, are particularly preferred in the emulsion (test method see below). The choice of non-ionic emulsifiers is advantageous as they act to inhibit unwanted foaming during application, and they contribute to uniform treatment on the substrate surface. Should foaming be desired for application, a foaming agent can be provided.

The silicones of formula I are classified as aminopolysiloxanes. An especially preferred product having formula I is commercially available from Wacker Chemie AG, Germany, under the brand name "Wacker® HC 303." Wacker® HC 303 contains approximately 17% solids (i.e. polysiloxane) by mass and is a mixture of polymerized siloxane species, made available as an aqueous emulsion whereby the polysiloxanes form droplets with an average size on the order of 25 nm in emulsion.

If the polysiloxanes cannot be purchased, they can be readily prepared according to any of procedures described by Mayer in U.S. Pat. No. 6,262,171 (corresponding to DE 195 17 346 A1). U.S. Pat. No. 6,262,171 is incorporated by reference herein in its entirety. As already indicated with reference to the commercial product "Wacker HC-303", component W1 is preferably used as an aqueous emulsion. The aqueous emulsions, W1, of the present disclosure are preferably prepared by first mixing a part of the water with emulsifier and amino-functional polysiloxane, followed by silane, and/or silicone resin. Mixing and emulsification are preferably carried out in a fast-running stator rotor stirring apparatus, also known as a Willems homogenizer, or colloid mill.

The solid (i.e. polysiloxane) content of the silicone in the ready to use aqueous emulsion is of from 10 to 30 wt.-%, preferably from 15 to 25 wt.-%, based on the total weight of said aqueous emulsion.

Component W2 is a silane quaternary ammonium salt, more specifically a trialkoxysilyl-alkyl-trialkylammonium compound and even more preferred a trialkoxysilyl-alkyl-trialkylammonium compound of the formula III $$(R^6O)_3 SiR^7 N^+ (R^8)(R^9)(R^{10}) Y^- \quad (III)$$

wherein:

$R^6$ is H, methyl, ethyl, propyl, or butyl, $R^7$ is $C_1$-$C_6$ alkyl, $R^8$ and $R^9$ are, independently, H, methyl, ethyl, propyl, or butyl, $R^{10}$ is $C_1$-$C_{22}$ alkyl, and Y is Cl or Br.

Alkyl chains with three or more carbon atoms may be straight chain or branched.

Compounds of the formula III are preferred, wherein $R^6$ is H or methyl, $R^7$ is ethyl or propyl, $R^8$ and $R^9$ are each methyl or ethyl, $R^{10}$ is $C_{16}$-$C_{22}$ alkyl, and Y is Cl.

Especially preferred is a compound of the formula III, wherein $R^6$, $R^7$ and $R^8$ are methyl, $R^9$ is propyl, $R^{10}$ is octadecyl and Y is chloride (dimethyloctadecyl [3-(trimethoxylsily)propyl] ammonium chloride (CAS No. 27668-52-6)); this compound is the active ingredient in a commercially product made available by Devan Chemicals NV, Belgium under the name of Aegis AEM 5772/5. AEM 5772/5 is an aqueous solution containing 3.7 wt.-% active ingredient. The active ingredient is known to act as an antimicrobial agent. For example, Bender, in U.S. patent application Ser. No. 2010/0115706 (corresponding to DE 10 2006 058 790 A1), describes the use of AEM 5772/5 as specific to antimicrobial benefit as a topical finish on fabrics and fibres. However, in connection with the present invention it has surprisingly shown to enhance water repellency.

Component W2 is preferably used as an aqueous dispersion having a solid content of silane quaternary ammonium salt of from 1.0 to 7.0 wt. %, preferably from 2.5 to 5.5. wt. %, more preferred from 3.0 to 5.0 wt. %, based on the total weight of said dispersion.

"Formulated" for the purpose of this disclosure means that the silane quaternary ammonium salt, W2, and the aminopolysiloxane of W1, are provided as complex waterborne mixtures in combination with such chemical adjuncts are surfactants, cosolvents, emulsifying agents, or dispersing agents, for example. The aminopolysiloxane of W1 can therefore be provided as a water-borne formulation having certain adjuncts present, and, separately, the silane quaternary ammonium salt of W2 can be provided as a water-borne formulation having certain adjuncts present, and in this form W1 and W2 can be combined and mixed with W3.

Formulated aminopolysiloxanes, and formulated silane quaternary ammonium salts are most effective when they are combined in formulated form so that the combination comprises from 3 to 10 volume parts of pure aminopolysiloxane (component W1) and from 0.1 to 1.0 volume parts of silane quaternary ammonium salt (as active ingredient in W2). The mixed components W1 and W2 are referred to herein as component W. The mixture of formulated aminofunctional polysiloxane and formulated silane quaternary ammonium salt has a mean particle/droplet diameter of from 10 to 400 nm, preferably from 20 to 200 nm, more preferred from 30 to 90 nm, and especially preferred from 50 to 60 nm as determined using the Particle/Droplet Size test method (see below).

Component W3 is water.

The following are examples of mixtures of components W1, W2 and W3 which are suitable for the present invention:

Component W:

| ID | Name | vol. % |
| --- | --- | --- |
| W1 | Wacker HC 303 | 25 |
| W2 | 3-(trihydroxysilyl) propyldimethyloctadecyl ammonium chloride | 0.68 |
| W3 | Water | 74.32 |
| | Total | 100 |

Concentrated versions of Component W are as follows:

Concentrate W-a:

| ID | Name | vol. % |
| --- | --- | --- |
| W1 | Wacker HC 303 | 50 |
| W2 | 3-(trihydroxysilyl) propyldimethyloctadecyl ammonium chloride | 0.68 |
| W3 | Water | 49.32 |
| | Total | 100 |

Concentrate W-b:

| ID | Name | vol. % |
| --- | --- | --- |
| W1 | Wacker HC 303 | 50 |
| W2 | 3-(trihydroxysilyl) propyldimethyloctadecyl ammonium chloride | 1.36 |
| W3 | Water | 48.64 |
| | Total | 100 |

The Soil Repellency Component (Component S)

Soil repellency refers to the ability of a fibrous substrate to resist the adhesion of dry soils. The tests performed to evaluate soiling performance levels generally involve applying standardized non liquid containing dry soil compositions to a fibrous substrate and further subjecting it to a moving load to simulate wear or trafficking and subsequently submitting the soiled substrate to a specified soil removal process, such as vacuuming. These tests may also involve water extracting. The substrate is then compared to a control sample or standard of established value.

Suitable soil repellency components, S, include aqueous cationic or anionic sol dispersions of solid organosiloxane copolymers consisting of:

$$R^{11}SiO_{3/2} \text{ units,} \tag{IV}$$

$$\text{and/or } R^{12}{}_2SiO \text{ units,} \tag{V}$$

$$\text{and/or } R^{13}{}_3SiO_{1/2} \text{ units,} \tag{VI}$$

wherein each of $R^{11}$, $R^{12}$, or $R^{13}$ is independently selected from the group consisting of alkyl and substituted alkyl radicals containing from 1 to 7 carbon atom, such as C1 to C8 straight chain or branched alkyls (including, but not limited to methyl, ethyl, propyl, etc.) and preferably having an average particle size diameter range of mean particle size between 12 and 400 nm, preferably between 12 and 250 nm, more preferably between 12 and 40 nanometers in dispersion, and about 5% to about 26% typical solids by weight, preferably from about 13% to about 19% by weight. Such organosiloxane copolymer dispersions are described by Knowlton in U.S. Pat. No. 6,225,403, and by Iverson in U.S. patent application Ser. No. 2010 0215894 (corresponding to EP 2391579). U.S. Pat. No. 6,225,403 is incorporated herein in its entirety. U.S. patent application Ser. No. 2010 0215894 is incorporated in its entirety. Knowlton and Iverson disclose solid organosiloxane co-polymers consisting of units of formulas IV, V, or VI, wherein each of $R^{11}$, $R^{12}$, $R^{13}$ is from the group consisting of hydrocarbon and substituted hydrocarbon radicals contains from 1 to 7 carbon atoms and has an overall particle size range of from about 10 Angstroms to about 2,000 Angstroms and about 5% to about 26% typical solids by weight, when applied to a fibrous substrate according to the method herein after described in fact provides for substantial reductions in the amount of fluorochemical required to impart oil, water and soil repellency levels as specified by the intended end use of a particular fibrous substrate. Knowlton also discloses a method for substantial reduction in the amount of fluorochemical required to impart specified repellency levels warranted for end use benefit on a particular fibrous substrate. The absence of fluorochemical altogether, while sustaining end use performance, is never contemplated by Knowlton.

Soil repellency components, S, can also be the colloidal aqueous dispersions containing organopolysiloxanes described by Heller in U.S. Pat. No. 7,981,961 (corresponding to EP 2,253,650). The colloidal aqueous dispersions described by Heller are composed of:
(a) organopolysiloxane units of general Formula VII:

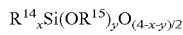

$$R^{14}_x Si(OR^{15})_y O_{(4-x-y)/2} \qquad (VII)$$

where x is 0, 1, 2 or 3 and y is 0, 1 or 2, with the proviso that the sum total x+y is ≤3, $R^{14}$ in each occurrence is the same or different and represents an SiC-bonded monovalent alkyl radical having 1 to 18 carbon atoms per radical, which may optionally include water-inert substituents, and $R^{15}$ in each occurrence may be the same or different and represents a hydrogen atom or a alkyl radical having 1 to 18 carbon atoms per radical which may be interrupted by one or more mutually separated oxygen atoms, or a radical of the formula —$COCH_3$, —$COC_2H_5$ or —$CH_2CH_2OH$, (b) optionally water-soluble or self-dispersing silane-containing polyvinyl alcohols and/or polyvinyl esters and/or copolymers with the proviso that more than 50 mol % of fully or partially saponified vinyl ester units are present, wherein at least one of the monomer units contains an attached silane, (c) optionally surface-active compounds, such as emulsifiers, and (d) water.

U.S. Pat. No. 7,981,961 is incorporated herein in its entirety. Colloidal silica dispersions, or organopolysiloxane polymers, or respective formulations containing one or more said compounds are commercially available from Wacker Chemie AG, Germany, under the tradenames WACKER® Finish CT 16 E and Advalon® FA 16. The preferred compounds exist in dispersion from 5 to 30 wt. %, preferably 10 to 20 wt. % of the organopolysiloxane. On their own, the soil repellency components given by formulas (IV), (V), (VI), and (VII) impart inadequate water-repellency behaviour when applied to fibrous substrates, e.g. carpets, but such deficiencies are remedied by the compositions, kits and methods described herein.

Mixing Ratio of Component W to Component S

The mix ratio of component W to S is flexible and can be individually adapted. The following recipes are given as examples

|  | Application rate |
|---|---|
| Component W | 1.0 wt % owf |
| Component S | 1.5 wt % owf |
| Foaming Agent | 0-4 g/L in the formulation |

A typical formulation used for foam application would look as follows:

|  | Application rate |
|---|---|
| Component W | 75 g/L |
| Component S | 113 g/L |
| Foaming Agent | 4 g/L |

Example for a recipe giving improved water repellency:

|  | Application rate |
|---|---|
| Component W | 1.5 wt % owf |
| Component S | 1.0 wt % owf |
| Foaming Agent | 0-4 gL in the formulation |

Example for a recipe giving improved soil protection:

|  | Application rate |
|---|---|
| Component R | 0.5 wt % owf |
| Component S | 2.0 wt % owf |
| Foaming Agent | 0-4 g/L in the formulation |

Stain-blocker

The fluorine-free compositions included herein may additionally contain one or more stain-block chemistries, in order to combine soil protection and water repellency with suitable stain protection. If a stain-blocker is used, it is preferred to also add a dispersing agent in order to support better application of the composition in aqueous form. Anti-stain components for use in the disclosed stain blocker compositions have a component bearing an acidic moiety which associates with polymer amine end groups and protects them from staining by acidic dye stains. The general category of chemicals suitable to the process of the instant invention can comprise any chemical that blocks positively charged dye sites. Stain blockers are available in various forms such as syntans, sulfonated novolacs, sulfonated aromatic aldehyde condensation products (SACS) and/or reaction phenolics, olefins, products of formaldehyde, phenolics, substituted thiophenolics, sulfones, substituted sulfones, polymers or copolymers of branched olefins, cyclic olefins, sulfonated olefins, acrylates, methacrylates, maleic dianyhydride, and organosulfonic acids. They are usually made by reacting formaldehyde, phenol, polymethacrylic acid, maleic dianyhydride, and sulfonic acid depending on specific chemistry. Further, the stain blocker is typically water soluble and generally penetrates the fiber while the anti-soil, usually a fluorochemical, is a non-water soluble dispersion that coats the surface of fiber.

Examples of stain blockers include, but are not limited to: phenol formaldehyde polymers or copolymers such as CEASESTAIN and STAINAWAY (from American Emulsions Company, Inc., Dalton, Ga.), MESITOL (from Bayer Corporation, Rock Hill, N.C.), ERIONAL (from Ciba Corporation, Greensboro, N.C.), INTRATEX (from Crompton & Knowles Colors, Inc., Charlotte, N.C.), STAINKLEER (from Dyetech, Inc., Dalton, Ga.), LANOSTAIN (from Lenmar Chemical Corporation, Dalton, Ga.), and SR-300, SR-400, and SR-500 (from E. I. du Pont de Nemours and Company, Wilmington, Del.); polymers of methacrylic acid such as the SCOTCHGARD FX series carpet protectors (from 3M Company, St. Paul Minn.); sulfonated fatty acids from Rockland React-Rite, Inc., Rockmart, Ga.); the ARROSHIELD™ stain resist product line (ArrowStar LLC, Dalton, Ga., U.S.), I-Protect® 2126 (INVISTA S. a r. l., Germany) and the Ultraguard SB-700 stain resist product line (Tri-Tex, Canada).

Stain-blockers are usually ionic in nature and can be equally well applied in both discontinuous and continuous application in the carpet manufacturing process. In the continuous application, the carpet runs through the usual dyeing and printing stages, whereas in the discontinuous application various separate baths are used The procedure to apply the stain-blocker to the textile, e.g. a rug, can be in two steps or in a single application step. In the two step procedure the stain-blocker application is followed by a treatment with the kit providing the soil resistant and water repellent components W and S. In the single step application, in which a co-application system is used, stain-block chemistry is applied and the W and S components are applied simultaneously, using foam application process technology such as is practiced in the trade.

A dosage rate of 3.0 to 7.0% aqueous liquor on weight of fiber is recommended for the stain blocker. In the case of discontinuous application a separate treatment bath for the stain-blocking is used after the carpet dyeing process. The carpet is treated for a time period of from 20 to 30 minutes at a temperature of from 70 to 75° C. The pH-value depends on the type of stain-blocker and should be held between 2.5 and 7.0. In the case of continuous application, the carpet runs through the usual dyeing and printing stages. The stain-blocker is applied through a suitable application mechanism such as a dip trough, waterfall applicator or fluidyer. The stain block liquor should be applied at or around 60° C.±10° C., although the process will also work at colder temperatures. The stain-blocker is fixed in the steamer with a steaming time of 60 to 90 seconds. The carpet is then washed, vacuumed and dried. Ideally, a soil resistant and water repellent application with components W and S follows the stain-blocker, in the same process.

Due to the cationic nature of the above described soil resistant and water repellent components W and S an application together with an anionic stain-blocker may seem to be technically impractical, because such a mismatch would promote rapid and irreversible coagulation, precipitation, or sedimentation of the various active, charged compounds. However, similar to the process of using both acidic and cationic dyestuffs for 'differential dyeing' of polyamide fibres, the addition of a dispersing agent will in fact keep such a liquor formulation comprising components W, S, and one or more oppositely charged stain blocking components, stable.

Suitable dispersing agents for this purpose include, but are not limited to, fatty alcohol polyglycolethers (e.g. Sera® Sperse M-DEW; DyStar Textilfarben GmbH & Co.) and alkyl aryl aminethoxylate (e.g. Avolan® IW liquid, Tanatex® Chemicals, The Netherlands), both of which are non-ionic in nature.

As mentioned already before, the textile fibres for the substrate, the carpet or the floor covering which is subjected to treatment with the compositions of the invention is of synthetic or natural origin. Suitable synthetic textiles are made from polyamide like polyamide 6.6, which is known as polyhexamethylene adipic acid amide, or polyamide 6, which is known as poly epsion caprolactame, or polyester like polyethylene terephthalate. Suitable textiles of natural origin are fibres made from wool or cotton.

Soil resistant and water repellent chemicals are usually applied as the last step in carpet finishing, after application of stain resist chemistry, and prior to drying or backing. Soil resistant and water repellent chemicals may be applied to the carpet via spray application or foam application, which is known in the art. Following dilution of as-received formulated products, industry-recommended rates for application are from 1.0 wt % to 1.6 wt % on weight of carpet fiber (corresponding to 500 ppm to 800 ppm elemental fluorine content). However, application ranges customary in the industry are usually from 0.8 to 1.2 wt %.

Spray application is the easiest method of applying soil resistant and water repellent chemicals. A spray facility may be installed in front of a dryer after coloration or in front of a latex backing oven. In order to prevent spray spreading, a suction hood should be installed above the spray bar. An aqueous solution of the composition is pumped through spray nozzles, installed above the running carpet, onto the carpet pile. For better distribution/penetration into the pile the solution should be applied to moistened carpet fiber.

Foam application is the most advanced method for the treatment of carpets with soil resistant and water repellent chemicals. By using this minimum moisture application system, highly concentrated liquors in a foam state are applied to carpets running past. A further advantage of the foam application method is its improved penetration. Foam application facilities can be installed in front of a dryer or a latex backing oven. In case of insufficient foam stability a foaming agent can be added advantageously. These foaming agents are formulated in such a way that they decompose under common drying temperatures and do not negatively impact the performance of the soil resistant and water repellent chemicals.

Suitable foaming agents include, but are not limited to alkyl amine oxides, for example Laviron 118 SK (Pulcra Chemicals, Germany) and Genaminox® CSL (Clariant, Switzerland), $C_{12}$ to $C_{18}$ coconut fatty acid alkyl dimethyl amine oxides, available from Clariant, sodium alpha olefin sulphonates (e.g. Hansanyl® OS, Hansa Group AG, Germany) and sodium laureth sulfate (e.g. Hansanol® NS 242 conc, Hansa Group AG, Germany).

Both spray application and foam application require a subsequent drying process. Raising the carpet pile face to a temperature of 110 to 130° C. during the drying process is important to allow the soil resistant and water repellent chemicals to completely bond onto the fibre.

Unlike to fluorochemicals, which combine both soil resistance and water repellency, the soil resistant/water repellent chemical composition of the present invention is basically a two-component-system comprising component R and component S.

The following recipe is a typical composition recommended for foam application:

| | |
|---|---|
| 1.5-5.0% owf | Component W-b |
| 0-1.0% owf | Component S |
| 0.1% owf | Sera ® Sperse M-DEW |
| 0.8-2.5% owf | I-Protect 2126 |
| 0-4 g/L in the formulation | Amphoteric alkyl amine oxide |

For their application on a carpet, the chemicals should preferably be mixed in order from top to bottom and thereafter applied as a foam.

Experimental Part

The following working examples are useful to illustrate more specifically the instant invention.

For the determination of the results of the invention, the following test methods have been applied:

ISO Soiling Test, EN ISO 11.378-2:2001

Carpet samples are mounted on the interior of a drum, and chrome alloy steel balls, nylon polymer pellets, and a standard dry soil are added. The soil used is AATCC 122/123 standard soil:

38 wt.-% Peat moss (dark)
17 wt.-% Portland cement
17 wt.-% Kaolin clay
17 wt.-% Silica (200 mesh)
1.75 wt.-% Carbon black (lamp or furnace black)
0.50 wt.-% Red iron oxide
8.75 wt.-% Mineral oil (medicinal grade)

After the drum is loaded it is sealed and the rotated for 1,000 revolutions, followed by vacuuming. The test simulates initial soiling by dirty shoe soles (represented by the polymer pellets) in that the soil acts on both the carpet, and on the polymer pellets. 1.000 revolutions in a drum. The carpets are then evaluated according to a gray scale: level 1=strong soiling, level 5=no soiling. Target=2.5 or higher. The test is later abbreviated as: "ISO"

Water Repellency Test AATCC 193, ISO 23232:

This test (adapted from AATCC method 193) determines a finished carpet's resistance to wetting by aqueous liquids. Drops of water-alcohol mixtures of varying surface tensions are placed on the fabric and the extent of surface wetting is determined visually. If after 10 seconds, four out of the five drops are still visible as spherical to hemispherical, the carpet is given a passing rating and the test is repeated with a higher rating number liquid. The repellency rating of the sample is the highest rating number liquid used to pass the repellency test. Carpets with a rating of 4 or higher have good anti-soiling properties. Without anti-soil treatment, most nylon carpets have a rating of 1 for water repellency.

The test is later abbreviated as: "WR".

The following liquids were used for water repellency tests:

| | Liquid Composition | |
|---|---|---|
| Rating Number | % Isopropanol | % Water |
| 1 | 2 | 98 |
| 2 | 5 | 95 |
| 3 | 10 | 90 |
| 4 | 20 | 80 |
| 5 | 30 | 70 |
| 6 | 40 | 60 |

Kool Aid Test, AATCC Method 175

Acid dye stain resistance is evaluated using a procedure modified from the American Association of Textile Chemists and Colorists (AATCC) Method 175-2003, "Stain Resistance: Pile Floor Coverings." 9 wt % of aqueous staining solution is prepared, according to the manufacturer's directions, by mixing cherry-flavored KOOL-AID® powder (Kraft/General Foods, White Plains, N.Y., a powdered drink mix containing, inter alia, FD&C Red No. 40). A carpet sample (4×6-inch) is placed on a flat non-absorbent surface. A hollow plastic 2-inch (5.1 cm) diameter cup is placed tightly over the carpet sample. Twenty ml of the KOOL-AID® staining solution is poured into the cup and the solution is allowed to absorb completely into the carpet sample. The cup is removed and the stained carpet sample is allowed to sit undisturbed for 24 hours. Following incubation, the stained sample is rinsed thoroughly under cold tap water, excess water is removed by centrifugation, and the sample is dried in air. The carpet sample was visually inspected and rated for staining according to the FD&C Red No. 40 Stain Scale described in AATCC Method 175-2003. Stain resistance is measured using a 1-10 scale. An undetectable test staining is accorded a value of 10.

Hot Water Extraction Test

The carpet test sample is not pre-cleaned and is placed flat on a smooth, horizontal surface. The cleaning solution of 1.0% Sapur® Duo (available at Ecolab®, pH=7) is used to do the hot water extraction with a Kaercher spray-extraction cleaner. The cleaning solution is added into the tank of the spray-extraction unit, whereas cleaning is accomplished by moving the cleaning head over the carpet's surface. Samples are cleaned over a maximum time period of 2 minutes or until the stain is completely removed (less than 2 min). The cleaned samples are air dried and rated as follows: 5.0=complete removal, 4.0=very good removal (>75%), 3.0=good removal (>50%), 2.0=fair removal (<50%) and 1.0=poor removal (<25%).

Particle Size Test Method

Particle size diameter is found by dynamic light scattering measurements made on dilute mixtures, and analysed using a Malvern Zetasizer Nano ZS (Malvern Instruments, U.S.). Analyses were performed at high resolution at 25° C. on the dilute sample for 50 seconds elapsed time to $d_{10}$, $d_{50}$ and $d_{90}$ values.

Zeta Potential Test Method

Zeta Potential was found by dynamic light scattering measurements made on dilute mixtures using a Malvern Zetasizer Nano ZS (Malvern Instruments, U.S.). Analyses were performed at high resolution at 25° C. on the dilute sample for 50 seconds elapsed time to give an average zeta potential.

Example 1 was performed to demonstrate the soiling performance and water repellency on fiber from a kit having the combination of Component W and Component S. The chemicals were applied by foam application to a standard velour carpet dyed "baby blue" made from nylon 6,6, and having a fibre weight of 600 g/m². The chemical application was followed by a curing process in a laboratory oven at 130° C. for about 15 minutes.

As can be seen in Table 1 the combination exceeds/meets the test requirements. As can be seen the combination is superior to an existing fluorochemical treatment. The fluorochemical used for comparison is Capstone® RCP (E.I. Du Pont de Nemours & Co., U.S.).

TABLE 1

| | | ISO | WR |
|---|---|---|---|
| | RUN 1: | | |
| 1.0% | Component W | 3.0 to 3.25 | 4* |
| 1.5% | Component S | | |
| 4 g/L | Amphoteric alkyl amine oxide | | |
| | RUN 2: | | |
| 1.0% | Component W | 2.75 to 3.0 | 4* |
| 1.0% | Component S | | |
| 4 g/L | Amphoteric alkyl amine oxide | | |
| | Comparative Run 1: | | |
| 1.0% | Capstone ® RCP | 2.75 to 3.0 | 4* |
| 4 g/L | Amphoteric alkyl amine oxide | | |
| | Comparative Run 2: | | |
| | Untreated Carpet | 1.75 to 2.0 | 0 |

(*Trial was performed more than once, results varied between WR = 4 and 6)

Example 2 was performed to demonstrate the soiling performance and water repellency of the single components, meaning they were not applied as part of a kit. The chemicals were applied by foam application to a standard velour carpet dyed "baby blue" made from nylon 6,6, and having a fiber weight of 600 g/m². The chemical application was followed by a curing process in a lab oven at 130° C. for about 15 minutes.

As can be seen in Table 2 Component W shows good water repellency, but inferior soiling results. In contrast, Component S shows good soiling results, but no water repellency.

TABLE 2

|  |  | ISO | WR |
|---|---|---|---|
| RUN 3: | | | |
| 1% | Component W | 2.25-2.5 | 4* |
| 4 g/l | Amphoteric alkyl amine oxide | | |
| RUN 4: | | | |
| 2.0% | Component W | 1.75 | 4* |
| 4 g/l | Amphoteric alkyl amine oxide | | |
| RUN 5: | | | |
| 1.0% | Component S | 3.0 | 0 |
| 4 g/l | Amphoteric alkyl amine oxide | | |
| RUN 6: | | | |
| 2.0% | Component S | 3.25 | 0 |
| 4 g/l | Amphoteric alkyl amine oxide | | |

Example 3 was performed in order to identify the optimum ratio/proportion between the two Components W and S, as supplied in a kit. The chemicals were applied by foam application to a standard velour carpet dyed "baby blue" made from nylon 6,6, and having a fiber weight of 600 g/m². The chemical application was followed by a curing process in a lab oven at 130° C. for about 15 minutes.

TABLE 3

|  |  | ISO | WR |
|---|---|---|---|
| 0.5% | Component W | 2.25-2.5 | 2 |
| 0.5% | Component S | | |
| 4 g/l | Amphoteric alkyl amine oxide | | |
| 0.5% | Component W | 2.5-2.75 | 2 |
| 1.0% | Component S | | |
| 4 g/l | Amphoteric alkyl amine oxide | | |
| 0.5% | Component W | 3.25 | 3 |
| 1.5% | Component S | | |
| 4 g/l | Amphoteric alkyl amine oxide | | |
| 0.5% | Component W | 3.5 | 3 |
| 2.0% | Component S | | |
| 4 g/l | Amphoteric alkyl amine oxide | | |
| 1.0% | Component W | 2.25-2.5 | 2 |
| 0.5% | Component S | | |
| 4 g/l | Amphoteric alkyl amine oxide | | |
| 1.5% | Component W | 2.0-2.25 | 4 |
| 0.5% | Component S | | |
| 4 g/l | Amphoteric alkyl amine oxide | | |
| 0.75% | Component W | 3.25 | 3-4 |
| 1.5% | Component S | | |
| 4 g/l | Amphoteric alkyl amine oxide | | |
| 1.0% | Component W | 2.75 | 3 |
| 2.0% | Component S | | |
| 4 g/l | Amphoteric alkyl amine oxide | | |
| 1.5% | Component W | 2.5 | 3 |
| 1.5% | Component S | | |
| 4 g/l | Amphoteric alkyl amine oxide | | |

Example 4 was performed in order to demonstrate the ability of the two kit components W and S to react under room temperature conditions. The chemicals were applied by foam application to a standard velour carpet dyed "baby blue" made from nylon 6,6, and having a fiber weight of 600 g/m². The chemical application was followed by a curing process at room temperature for about 24 hours.

TABLE 4

|  |  | ISO | WR |
|---|---|---|---|
| 2.0% | Component W | 2.75 | 3 |
| 3.0% | Component S | | |

Example 5 was performed to demonstrate the performance of a kit made of Component W-b and Component S in combination with a stainblocker. The chemicals were applied by foam application to a standard velour carpet dyed "baby blue" made from nylon 6,6, and having a fiber weight of 600 g/m². The chemical application was followed by a curing process in a lab oven at 130° C. for about 15 minutes.

TABLE 5

|  |  | ISO | WR | Kool Aid |
|---|---|---|---|---|
| 3.5% | Component W-b | 2.75 | 3 | 9-10 |
| 0.5% | Component S | | | |
| 0.1% | Sera Sperse M-DEW | | | |
| 1.6% | I-PROTECT 2126 | | | |

Example 6 was performed to demonstrate the durability after hot water extraction of a carpet treated with a kit providing Component W, and component S. The chemicals were applied by foam application to a standard velour carpet dyed "baby blue" made from nylon 6,6, and having a fiber weight of 600 g/m². The chemical application was followed by a curing process in a lab oven at 130° C. for about 15 minutes. The fluorochemical used for comparison is Capstone® RCP (E.I. Du Pont de Nemours & Co., U.S.). The Hot Water Extraction test was then performed. The test showed the fluorine free treatments described by this disclosure perform at least as well as the fluorochemical treatment, and perform much better than the untreated nylon carpet.

TABLE 6

|  |  |  | ISO | WR |
|---|---|---|---|---|
| 1.0% | Component W | Orig. Sample | 5 | 4* |
| 1.5% | Component S | After ISO Soiling Test | 3.5 | 4 |
| 4 g/l | Amphoteric alkyl amine oxide | After HWE | 4.5 | 4 |
| 1.25% | Capstone ECP | Orig. Sample | 5 | 4* |
|  |  | After ISO Soiling Test | 3 | 4* |
| 4 g/l | Amphoteric alkyl amine oxide | After HWE | 4.25 | 4* |
| Untreated | Control Sample | | | |
|  |  | Orig. Sample | 5 | 0 |
|  |  | After ISO Soiling Test | 1.75 | 0 |
|  |  | After HWE | 2.5 | 0 |

(*Trial has been carried out more than once. Results vary between WR = 4 and 6)

EMBODIMENTS

1. An article comprising:
(a) a fibrous substrate having a first surface and a second surface,
(b) a first surface treatment comprising a polysiloxane and an alkyl trialkoxysilane applied to the first surface of said fibrous substrate,
(c) a second surface treatment comprising nanoparticulate silica applied to the first surface of said fibrous substrate.

2. The article of embodiment 1 further comprising a third surface treatment applied to the first surface of said fibrous substrate selected from the group consisting of syntans, novolac resins, resole resins, phenolic aldehyde condensation products, polymethacrylates, polyacrylates, maleic anyhydride-olefinic resins and combinations thereof.

3. The article of embodiment 1 wherein said polysiloxane is a polyaminosiloxane.

4. The article of embodiment 3 wherein said polyaminosiloxane is selected form the group consisting of a hydroxyterminated polyaminosiloxane, an alkoxyterminated polyaminosiloxane, and combinations thereof.

5. The article of embodiment 4, wherein said alkoxyterminated polyaminosiloxane is terminated by methoxy, ethoxy, propoxy or butoxy groups.

6. The article of embodiment 1 wherein the alkyl trialkoxysilane comprises a silane quaternary ammonium salt of the formula $(R^1O)_3SiR^2N^+(R^3)(R^4)(R^5)Y^-$ wherein:
a) $R^1$ is selected from the group consisting of H, methyl, ethyl, propyl, and butyl,
b) $R^2$ is $C_1$-$C_6$ alkyl,
c) $R^3$ and $R^4$ are, independently, H, methyl, ethyl, propyl, or butyl,
a) $R^5$ is $C_1$-$C_{22}$ alkyl,
b) and Y is Cl or Br.

7. The article of embodiment 6 wherein the silane quaternary ammonium salt is 3-(trimethoxysilyl)propyldimethyloctadecyl ammonium chloride.

8. The article of embodiment 1 wherein the nanoparticulate silica bears alkyl groups bonded to Si atoms at the particle surface.

9. The article of embodiment 8 wherein the alkyl groups are $C_1$-$C_8$ hydrocarbyl groups.

10. The article of embodiment 1 wherein the nanoparticulate silica is an aqueous dispersion of cationic or anionic particles.

11. The article of embodiment 10 wherein said particles are cationic.

12. The article of embodiment 1 wherein said polysiloxane and alkyltrialkoxysilane cure upon drying said article.

13. The article of embodiment 1 wherein the fibrous substrate is carpet, rug, paper, filament, fiber, yarn, or nonwoven.

14. The article of embodiment 1 or 2 wherein the sum total of all treatments deposited to the first surface of said fibrous substrate is from about 0.005 weight percent to about 8 weight percent.

15. An article comprising:
a) a fibrous substrate having a first surface and a second surface,
b) a first surface treatment comprising the reaction product of a polysiloxane and an alkyl trialkoxysilane applied to the first surface of said fibrous substrate,
c) a second surface treatment comprising nanoparticulate silica applied to the first surface of said fibrous substrate.

16. The article of embodiment 13 wherein said carpet further comprises tufted fibers, backing material, and latexing material for purpose of adhering said tufted fibers to said backing material.

17. The carpet of embodiment 13 wherein said article produces a water repellency rating of 4 and a soil repellency rating of 4.5 by the Hot Water Extraction test method.

18. A kit for treating a surface of a fibrous substrate comprising:
a) A first composition comprising a polysiloxane and an alkyl trialkoxysilane,
b) A second composition comprising an aqueous nanoparticulate silica.

19. The kit of embodiment 18, further comprising a third composition selected from the group consisting of syntans, novolac resins, resole resins, phenolic aldehyde condensation products, polymethacrylates, polyacrylates, maleic anyhydride-olefinic resins and combinations thereof.

20. The kit of embodiment 18 wherein said polysiloxane is a polyaminosiloxane.

21. The kit of embodiment 20 wherein said polyaminosiloxane is selected form the group consisting of a hydroxyterminated polyaminosiloxane, an alkoxyterminated polyaminosiloxane, and combinations thereof.

22. The kit of embodiment 21 wherein said polyaminosiloxane is terminated by methoxy, ethoxy, propoxy or butoxy groups.

23. The kit of embodiment 18 wherein the alkyltrialkoxysilane is a silane quaternary ammonium salt of the formula $(R^1O)_3SiR^2N^+(R^3)(R^4)(R^5)Y^-$ wherein:
a) $R^1$ is selected from the group consisting of H, methyl, ethyl, propyl, or butyl,
b) $R^2$ is $C_1$-$C_6$ alkyl,
c) $R^3$ and $R^4$ are, independently, H, methyl, ethyl, propyl, or butyl,
d) $R^5$ is $C_1$-$C_{22}$ alkyl,
e) and Y is Cl or Br.

24. The kit of embodiment 23 wherein the silane quaternary ammonium salt is 3-(trimethoxysilyl)propyldimethyloctadecyl ammonium chloride.

25. The kit of embodiment 18 wherein the nanoparticulate silica bears alkyl groups bonded to Si atoms at the particle surface.

26. The kit of embodiment 25 wherein the alkyl groups are $C_1$-$C_8$ hydrocarbyl groups.

27. The kit of embodiment 18 wherein the nanoparticulate silica is an aqueous dispersion of cationic or anionic particles.

28. The kit of embodiment 27 wherein said particles are cationic.

29. A method of making a kit for treating a fibrous substrate comprising
a) Combining polysiloxane, alkyltrialkoxysilane and water to yield a first kit component, and
b) Providing a second kit component comprising aqueous nanoparticulate silica.

30. The method of embodiment 29, further comprising providing a third kit component selected from the group consisting of syntans, novolac resins, resole resins, phenolic aldehyde condensation products, polymethacrylates, polyacrylates, maleic anyhydride-olefinic resins.

31. The method of embodiment 29 wherein said polysiloxane is a polyaminosiloxane.

32. The method of embodiment 31 wherein said polyaminosiloxane is selected form the group consisting of a hydroxyterminated polyaminosiloxane, an alkoxyterminated polyaminosiloxane, and combinations thereof.

33. The method of embodiment 32, wherein said alkoxyterminated polyaminosiloxane is terminated by methoxy, ethoxy, propoxy or butoxy groups.

34. The method of embodiment 29 wherein the alkyltrialkoxysilane is a silane quaternary ammonium salt of the formula

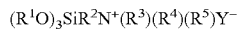

wherein:
a) $R^1$ is selected from the group consisting of H, methyl, ethyl, propyl, or butyl,
b) $R^2$ is $C_1$-$C_6$ alkyl,
c) $R^3$ and $R^4$ are, independently, H, methyl, ethyl, propyl, or butyl,
d) $R^5$ is $C_1$-$C_{22}$ alkyl,
e) and Y is Cl or Br.

35. The method of embodiment 34 wherein the silane quaternary ammonium salt is 3-(trimethoxysilyl)propyldimethyloctadecyl ammonium chloride.

36. The method of embodiment 29 wherein the nanoparticulate silica bears alkyl groups bonded to Si atoms at the particle surface.

37. The method of embodiment 36 wherein the alkyl groups are $C_1$-$C_8$ hydrocarbyl groups.

38. The method of embodiment 29 wherein the nanoparticulate silica is an aqueous dispersion of cationic or anionic particles.

39. The method of embodiment 38 wherein said particles are cationic.

40. A method of applying a kit for treating a fibrous substrate comprising
a) Application of a kit component comprising a polysiloxane, an alkyl trialkoxysilane, and combinations thereof onto said fibrous substrate,
b) Application of a kit component comprising aqueous nanoparticulate silica onto said fibrous substrate, and
c) Drying the fibrous substrate.

41. The method of embodiment 40, further comprising application of a kit component selected from the group consisting of syntans, novolac resins, resole resins, phenolic aldehyde condensation products, polymethacrylates, polyacrylates, and maleic anyhydride-olefinic resins and combinations thereof.

42. The method of embodiment 40 wherein said polysiloxane is a polyaminosiloxane.

43. The method of embodiment 42 wherein said polyaminosiloxane is selected from the group consisting of a hydroxyterminated polyaminosiloxane, an alkoxyterminated polyaminosiloxane, and combinations thereof.

44. The method of embodiment 42 wherein said alkoxyterminated polyaminosiloxane is terminated by methoxy, ethoxy, propoxy or butoxy groups.

45. The method of embodiment 40 wherein the alkyl trialkoxysilane is a silane quaternary ammonium salt of the formula

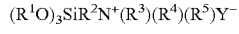

wherein:
a) $R^1$ is selected from the group consisting of H, methyl, ethyl, propyl, or butyl,
b) $R^2$ is $C_1$-$C_5$ alkyl,
c) $R^3$ and $R^4$ are, independently, H, methyl, ethyl, propyl, or butyl,
d) $R^5$ is $C_1$-$C_{22}$ alkyl,
e) and Y is Cl or Br.

46. The method of embodiment 45 wherein the silane quaternary ammonium salt is 3-(trimethoxysilyl)propyldimethyloctadecyl ammonium chloride.

47. The method of embodiment 40 wherein the nanoparticulate silica bears alkyl groups bonded to Si atoms at the particle surface.

48. The method of embodiment 47 wherein the alkyl groups are $C_1$-$C_8$ hydrocarbyl groups.

49. The method of embodiment 40 wherein the nanoparticulate silica is an aqueous dispersion of cationic or anionic particles.

50. The method of embodiment 49 wherein said particles are cationic.

51. The method of embodiment 39 wherein the fibrous substrate is carpet, rug, paper, filament, fiber, yarn, or nonwoven.

52. The method of embodiment 40 or 41 wherein the sum total of all treatments applied to the first surface of said fibrous substrate after drying is from about 0.005 weight percent to about 8 weight percent.

53. The method of embodiment 40 or 41 wherein application is accomplished by spraying, dipping, foaming, or padding.

The invention claimed is:
1. A fluorine-free composition comprising:
a. a first composition comprising
i. an aqueous silicone emulsion having a non-volatile silicone content of from 10 to 30 wt. %, based on the total weight of said aqueous emulsion, and having a particle size, $d_{50}$, from 25 to 100 nm,
ii. an aqueous dispersion of a silane quaternary ammonium salt having a solid content of from 1.0 to 7.0 wt %, based on the total weight of said dispersion,
wherein the combination of (i) and (ii) has an average zeta potential of 0.07 according to the Zeta Potential Test, and
iii. water,
whereby the mixing ratio is from 0.5 to 4.0 volume parts for (i), from 0.7 to 1.5 volume parts for (ii), and from 1.0 to 4.0 volume parts for (iii), and
b. a second composition comprising a soil repellency component that is an aqueous dispersion of colloidal organosiloxanes, organosiloxane polymers or organosiloxane copolymers, and which has an overall cationic or anionic charge, and that are of average particle size between 25 and 400 nm.

2. The composition according to claim 1, wherein the combination of (i) and (ii) has an average particle size diameter of from 10 to 400 nm as determined using the Particle Size test method.

3. The composition according to claim 1, wherein the silicone is an aminopolysiloxanes of Formula 1:

wherein:
$R^1$ means identical or different monovalent, nitrogen-free, optionally halogen substituted, SiC-bonded $C_1$-$C_6$ alkyl radicals,
$R^2$ means identical or different monovalent, optionally halogen-substituted SiC-bonded, basic nitrogen containing $C_1$-$C_6$ alkyl radicals,
$R^3$ is H or a $C_1$-$C_8$ alkyl radical,
a is 0, 1, 2 or 3, preferably 0, 1 or 2,
b is 0, 1, 2 or 3, preferably 0, 1 or 2, or at least an average of 0.05, and
c is 0 or 1,
with the proviso that the sum of a, b, and c is less than or equal to 3 and that the amine number of the organopolysiloxane is at least 0.01.

4. The composition according to claim 1, wherein the silane quaternary ammonium salt is a compound of the formula III $$(R^6O)_3SiR^7N^+(R^8)(R^9)(R^{10})Y^- \quad (III)$$

wherein:
$R^6$ is H, methyl, ethyl, propyl, or butyl,
$R^7$ is $C_1$-$C_6$ alkyl,
$R^8$ and $R^9$ are, independently, H, methyl, ethyl, propyl, or butyl,
$R^{10}$ is $C_1$-$C_{22}$ alykl, and
Y is Cl or Br.

5. The composition according to claim 1, wherein the soil repellency component includes aqueous cationic or anionic sol dispersions of solid organosiloxane copolymers consisting of:

$$R^{11}SiO_{3/2} \text{ units}, \quad (IV)$$

$$\text{and/or } R^{12}{}_2SiO \text{ units}, \quad (V)$$

$$\text{and/or } R^{13}{}_3SiO_{1/2} \text{ units} \quad (VI)$$

wherein each of $R^{11}$, $R^{12}$, or $R^{13}$ is independently selected from the group consisting of alkyl and substituted alkyl radicals containing 1 to 7 carbon atoms.

6. The composition according to claim 1, wherein the soil repellency component is a colloidal aqueous dispersions containing:
a. organopolysiloxane units of general Formula VII:

$$R^{14}{}_xSi(OR^{15})_yO_{(4-x-y)/2} \quad (VII)$$

where
x is 0, 1, 2 or 3 and y is 0, 1 or 2,
with the proviso that the sum total x+y is ≤3,
$R^{14}$ in each occurrence is the same or different and represents an SiC-bonded monovalent alkyl radical having 1 to 18 carbon atoms per radical, and
$R^{15}$ in each occurrence is the same or different and represents a hydrogen atom or a alkyl radical having 1 to 18 carbon atoms per radical which are or are not interrupted by one or more mutually separated oxygen atoms, or is a radical of the formula —$COCH_3$, —$COC_2H_5$ or —$CH_2CH_2OH$,
b. optionally water-soluble or self-dispersing silane-containing polyvinyl alcohols and/or polyvinyl esters and/or copolymers with the proviso that more than 50 mol-% of fully or partially saponified vinyl ester units are present, wherein at least one of the monomer units contains an attached silane,
c. optionally surface-active compounds, such as emulsifiers, and
d. water.

7. The composition according to claim 1, which additionally contains one or more stain-blocker(s).

8. An article of manufacture, especially a carpet or a textile floor covering, which is treated with the composition of claim 1, whereby the article is rendered water repellent and soil resistant.

9. A method for the treatment of textiles or fibres of synthetic or natural origin with a composition as defined in claim 1 in an effective amount to render the textiles or fibres water repellent and soil resistant.

10. The method of claim 9, wherein treatment is by spray application.

11. The method of claim 9, wherein treatment is by foam application.

12. A kit providing in separate containers:
a. a mixture of the components (i)-(iii) of the first composition defined in claim 1 in the given mixing ratio, and
b. the second composition as claimed in claim 1.

* * * * *